(12) United States Patent
Juenemann et al.

(10) Patent No.: US 8,535,194 B2
(45) Date of Patent: Sep. 17, 2013

(54) COUPLING ASSEMBLY AND DRIVELINE ASSEMBLY FOR A MOTOR VEHICLE WITH MULTIPLE DRIVEN AXLES

(75) Inventors: Peter Juenemann, Lohmar (DE); Fred Kramer, Wachtberg (DE); Michael Schwekutsch, Wermelskirchen (DE); Mark Schmidt, Koenigswinter (DE); Theodor Gassmann, Siegburg (DE)

(73) Assignee: GKN Driveline International GmbH, Lohmar, MI (US)

( * ) Notice: Subject to any disclaimer, the term of this patent is extended or adjusted under 35 U.S.C. 154(b) by 304 days.

(21) Appl. No.: 13/059,181

(22) PCT Filed: Jul. 22, 2009

(86) PCT No.: PCT/EP2009/005310
§ 371 (c)(1),
(2), (4) Date: Feb. 15, 2011

(87) PCT Pub. No.: WO2010/017881
PCT Pub. Date: Feb. 18, 2010

(65) Prior Publication Data
US 2011/0143878 A1 Jun. 16, 2011

(30) Foreign Application Priority Data
Aug. 15, 2008 (DE) .......................... 10 2008 037 885

(51) Int. Cl.
*F16H 48/20* (2012.01)
*B60K 17/35* (2006.01)
(52) U.S. Cl.
USPC ............................ 475/231; 475/249; 180/249

(58) Field of Classification Search
USPC .......................... 475/231, 249; 180/248, 249
See application file for complete search history.

(56) References Cited

U.S. PATENT DOCUMENTS

| 5,385,513 | A | * | 1/1995 | Ishii et al. ..................... 475/203 |
| 5,520,589 | A | * | 5/1996 | Dewald et al. ................ 475/231 |
| 6,027,422 | A | | 2/2000 | Yamazaki |
| 6,474,433 | B1 | * | 11/2002 | Yoshioka ...................... 180/248 |

(Continued)

FOREIGN PATENT DOCUMENTS

| DE | 103 04 730 B3 | 10/2004 |
| EP | 1 506 890 A1 | 2/2005 |
| WO | WO-2006/060139 A2 | 6/2006 |

OTHER PUBLICATIONS

English translation of International Search Report and Opinion for PCT/EP2009/005310 dated Feb. 15, 2011.

(Continued)

*Primary Examiner* — Tisha Lewis
(74) *Attorney, Agent, or Firm* — Rader, Fishman & Grauer, PLLC

(57) ABSTRACT

A coupling assembly for optionally connecting a driving axle in a motor vehicle having multiple driving axles is disclosed. The coupling assembly comprises an externally controllable friction coupling with a coupling input part and an output part. The input part is rotatingly drivable around an axis of rotation A. A differential drive with an input element and two output elements which are drivingly connected to the input element, are also included. The input element of the differential drive is arranged coaxially relative to the coupling output part and drivably connected to the coupling output part for the purpose of transmitting torque. A driveline assembly having such a coupling assembly is also disclosed.

19 Claims, 15 Drawing Sheets

(56) References Cited

U.S. PATENT DOCUMENTS

| | | | |
|---|---|---|---|
| 7,175,557 B2 * | 2/2007 | Kirkwood et al. | ............ 475/150 |
| 2002/0049110 A1 | 4/2002 | Ishikawa | |
| 2003/0199359 A1 | 10/2003 | Tucker-Peake | |
| 2005/0003923 A1 | 1/2005 | Ishikawa | |
| 2005/0006164 A1 | 1/2005 | Teraoka | |
| 2008/0047798 A1 | 2/2008 | Wittkopp et al. | |
| 2008/0182700 A1 | 7/2008 | Earhart | |

OTHER PUBLICATIONS

PCT International Search Report for PCT/EP2009/005310 dated Nov. 26, 2009.

* cited by examiner

COUPLING ASSEMBLY AND DRIVELINE ASSEMBLY FOR A MOTOR VEHICLE WITH MULTIPLE DRIVEN AXLES

CROSS REFERENCE TO RELATED APPLICATIONS

This application is a National Phase of International Application No. PCT/EP2009/005310, filed on Jul. 22, 2009, which claims priority to German Application No. 10 2008 037 885.2 filed on Aug. 15, 2008, which applications are hereby incorporated by reference in their entirety.

TECHNICAL FIELD

The disclosure relates to a coupling assembly for connecting a driving axle in a motor vehicle driven by a plurality of axles. More specifically, the disclosure relates to a coupling assembly that comprises a first driveline for permanently driving a first driving axle and a second driveline which can be optionally connected to transmit torque to a second driving axle.

BACKGROUND

From EP 0 466 863 B1 there is known a device for connecting a driveline in a motor vehicle with a transfer case for a plurality of drivelines. One of the drivelines is permanently connected to a drive unit and a further driveline that can be connected to the drive unit. For connecting the driveline, there is provided an electronically actuatable friction coupling which can be arranged in a transfer case or a differential drive.

In such drive assemblies with a connectable driveline, the associated driving axle is not driven permanently in order to keep any losses low. But in the disconnected condition, too, the torque transmitting components of the connectable driving axle also rotate, which leads to undesirable power losses. Such power losses are responsible for motor vehicles having multiple driven axles with a hang-on driveline comprising a higher fuel consumption than motor vehicles driven by one axle only.

What is needed is a coupling assembly for connecting a driving axle in a motor vehicle having multiple driven axles, which coupling assembly permits a reduction in undesirable drag moments and power losses and whose design is simple and cost-effective.

SUMMARY

A coupling assembly for connecting a driving axle in the driveline of a motor vehicle having multiple driving axles is disclosed. In one exemplary configuration, the coupling assembly comprises an externally controllable friction coupling with a coupling input part and a coupling output part. The coupling input part is rotatingly drivable around an axis of rotation A. A differential drive with an input element is also included and two output elements are drivingly connected to the input element. The input element of the differential drive is arranged coaxially relative to the coupling output part and drivably connected to the coupling output part for transmitting torque.

In connection with this application, "drivably connected" means that the coupling output part and the differential input part, for the purpose of transmitting torque, are connected to one another either directly or that said two parts can be switchably connected to one another. The inventive coupling assembly is advantageous in that the driving axle driven by the coupling assembly can be uncoupled from the driveline by opening the friction coupling. In such a case, the components of the differential drive rotate in a load-free condition. However, at least the coupling input part is uncoupled from the differential drive, so that drag moments and friction losses are reduced.

The inventive coupling assembly is particularly suitable for a drive assembly for a multi driving axle motor vehicle with a permanently driven first driving axle and a second driving axle which can be connected on demand, i.e. for connecting and disconnecting the second driving axle. According to a further exemplary embodiments, a further coupling is provided at an end of the propeller shaft which is opposite the coupling assembly. This makes it possible—by opening the two couplings provided in front of and behind the propeller shaft—to disconnect the entire propeller shaft and the components rotating therewith. This means that the propeller shaft no longer rotates, so that drag moments and friction losses are reduced considerably, which advantageously affects the fuel consumption.

According to an exemplary configuration, the friction coupling is provided in the form of a multi-plate coupling. The multi-plate coupling comprises an outer plate carrier to which outer plates are connected in a rotational fixed and axially displaceable way, as well as an inner plate carrier to which inner plates are connected in a rotationally fixed and axially displaceable way. The outer plates and inner plates are arranged so as to axially alternate, and they jointly form a plate package which can be loaded and released by an externally controllable axial setting device. More particularly, it is proposed that the plate package is loaded by the axial setting device via a pressure plate, with the plate package, at its side axially opposed to the pressure plate, being axially supported on a supporting plate. In one exemplary arrangement, the outer plate carrier is firmly connected to the coupling input part and, more particularly, it is provided in one piece therewith, wherein torque is introduced from the propeller shaft into the coupling assembly via the coupling input part. The inner plate carrier is firmly connected to the coupling output part or produced so as to be integral therewith. However, a reverse arrangement is also conceivable.

In one exemplary arrangement, the input element of the differential drive is provided in the form of a carrier element in which differential gears are rotatably supported on individual axles and rotate jointly with the carrier element around the axis of rotation A of the differential drive. The differential gears engage a first and a second sideshaft gear for the purpose of driving same. The two sideshaft gears are rotatingly supported in the carrier element coaxially to the axis of rotation A; the first and second sideshaft gears are connected to sideshafts in a rotationally fixed way for transmitting torque to the associated wheels of the motor vehicle. To achieve a compact coupling assembly design it is advantageous if the carrier element of the differential drive is supported in the coupling input part so as to be rotatable around the axis of rotation A. In this exemplary arrangement, the coupling input part forms part of the coupling housing in which the carrier element is received. However, it is also possible for the carrier element to be rotatably supported in a separate stationary housing in which the friction coupling, too, is supported coaxially to the axis of rotation A so as to be rotatable relative thereto. The coupling assembly can be designed in such a way that the plate package is arranged so as to axially adjoin the differential gear set, with the plate package then being positioned on a small radius inside the carrier element. This results in a radially compact design. However, it is also possible for the plate package to be arranged so as to axially overlap the carrier element on the radial outside, there thus being achieved an axially compact design. Intermediate types of arrangement of the pate package relative to the carrier element are also conceivable.

According to a first exemplary arrangement, it is proposed that for torque transmitting purposes, the coupling output part is firmly connected to the input element of the differential drive, more particularly is produced so to be integral therewith. In this way, when the axial setting device is in the actuated condition, i.e. when the friction coupling is closed, torque is transmitted from the coupling input part to the coupling output part and from there directly to the differential drive. As far as the friction couplings described here are concerned, the friction coupling can assume any intermediate position between the open position in which no torque is transmitted and the completely closed position in which the coupling input part and the coupling output part rotate at the same speed. In this way, the torque transmitted to the optionally drivable driving axle can be controlled accurately.

According to a second exemplary arrangement, the inventive coupling assembly, in addition to the friction coupling, comprises a switching clutch. The clutch, functionally, is arranged in series between the friction coupling and the differential drive, with the clutch comprising a first clutch part connected at least in a rotationally fixed way to the coupling output part as well as a second clutch part connected at least in a rotationally fixed way to the carrier part of the differential drive. The clutch is provided in the form of a form-fitting clutch, i.e. the first coupling part and the second coupling part can be engaged form-fittingly for torque transmitting purposes. Examples for form-fitting clutches include dog clutches, claw couplings or toothed couplings, with the toothed couplings having a splined toothing or Hirth toothing.

According to another embodiment, the first clutch part of the clutch is firmly connected to the coupling output part, more particularly is produced so as to be integral therewith. The second clutch part of the clutch is firmly connected to the carrier element, more particularly produced so as to be integral therewith. As a result of the clutch parts of the clutch being produced so as to be integral with the respective component to which they are connected, there is achieved in an advantageous way a compact coupling assembly design involving only a small number of parts.

The actuation of the coupling assembly for transmitting torque to the differential drive and the associated driving axle is effected in two stages. First the clutch is closed, so that torque can be transmitted from the friction coupling to the differential drive. The clutch is closed by axially loading the pressure plate by means of the axial setting device. In one arrangement, via an axial bearing or spring mechanism, the pressure plate is axially supported against the coupling outer part, so that an axial displacement of the pressure plate causes the coupling output part of the friction coupling, respectively the clutch part of the clutch firmly connected thereto, to be displaced towards the differential drive. In this way, the two clutch parts of the clutch form-fittingly engage one another, so that they are able to transmit torque to the carrier element of the differential drive. After the clutch has been closed, the torque to be transmitted from the friction coupling to the optionally connectable driving axis can be set at required by suitably actuating the axial setting device. For opening the clutch, i.e. in the non-actuated condition of the axial setting device, there are provided a spring mechanism between the clutch parts of the clutch, which for example can be provided in the form of plate springs. In an additional exemplary arrangement, it is proposed that, a friction-reducing axial bearing is arranged between said components. The spring mechanism and the axial bearing can be arranged in a space-saving way in inner recesses of the coupling output part and the carrier element of the differential drive.

According to a further exemplary embodiment, the first clutch part of the clutch is provided in the form of a separate component which is connected to the coupling output part of the friction coupling in a rotationally fixed and axially displaceable way. In this embodiment the coupling outer part is held axially non-displaceably in the housing, and the switching movement for closing the clutch is effected by the first clutch part which is axially moved relative to the coupling output part. For again opening the clutch, i.e. for uncoupling the first clutch part from the second clutch part, there is provided a spring mechanism which loads the first clutch part towards the plate package.

According to a first exemplary arrangement, the first clutch part of the clutch can be firmly connected to the supporting plate of the friction coupling, more particularly produced so as to be integral therewith. This results in a compact design with a small number of parts. The supporting plate is connected to the coupling output part in a rotationally fixed and axially displaceable way, with the plate package being axially arranged between the supporting plate and the pressure plate. To that extent, the friction coupling and the clutch are connected in series, i.e. only by axially loading the plate package a closing of the form-fitting clutch is effected. As the supporting plate is axially movable and passes on introduced axial force to the carrier element, it can also be referred to as the second pressure plate. In one arrangement, the returning spring is arranged between the second pressure plate and the input element of the differential drive.

According to a second exemplary arrangement, the first clutch part of the clutch can also be firmly connected to a sleeve which is arranged coaxially relative to the coupling output part, which is connected thereto in a rotationally fixed way and is axially displaceably held relative thereto. The sleeve which can also be referred to as a sliding muff, is axially loaded by the pressure plate when the axial setting device is actuated, so that the clutch is closed with torque being transmitted from the coupling output part of the friction coupling to the carrier element of the differential drive.

It applies to all the above-mentioned embodiments with a clutch that, when the axial setting device is actuated, first the clutch is closed, so that torque can be transmitted to the differential drive and that only thereafter, the torque transmissible by the friction coupling to the hang-on driving axle can be controlled as required.

According to a further exemplary embodiment, which also applies to all the above-mentioned embodiments with a clutch, a synchronizing unit is provided between the coupling output part and the carrier element of the differential drive. The synchronizing unit is designed in such a way that when the coupling output part is axially displaced towards the differential drive, there is effected, at least partially, a speed adjustment between the coupling output part and the carrier element of the differential drive. This is advantageous in that undesirable switching noises which can occur when the clutch is opened and closed, can be reduced or avoided altogether.

In the embodiment with a synchronizing unit, the connection of the driveline and, respectively, the actuation of same is, in principle, effected in three stages. First the speed of the coupling output part is adapted to the speed of the carrier element of the differential drive, a process which can also be referred to as synchronization. Subsequently, when said two components and the clutch parts of the clutch connected thereto are synchronized or partially synchronized, the clutch is closed by further actuating the pressure plate. It is only thereafter that the torque transmissible from the friction coupling to the hang-on driving axle is controlled as required.

In another exemplary embodiment, the synchronizing unit has at least one pair of friction faces which, more particularly, can be conical in shape. The pair of friction faces can be provided in the form of a separate component which is arranged in the torque flow between the output part of the friction coupling and the input part of the differential drive. The synchronizing unit and the clutch are functionally arranged in parallel between the coupling output part and the input part of the differential drive, and when actuating the axial setting device, as already mentioned above, the synchronizing unit only initiates a speed adjustment when the clutch produces a rotationally fixed connection between the coupling output part and the input part of the differential drive.

Furthermore, a driveline assembly for a motor vehicle with a drive unit and multiple driven axles, which driveline assembly comprises a first driveline which is permanently drivable by the drive unit in order to transmit torque to the first driving axle; a second driveline which optionally, in addition to the first driveline, can be drivingly connected to the drive unit for transmitting torque in order to drive a second driving axle, wherein the second driveline comprises a propeller shaft which is arranged in the torque flow between a transfer case driven by the drive unit and the second driving axle, wherein there are provided coupling arrangement for coupling and uncoupling the propeller shaft relative to the transfer case, wherein the second driveline comprises a coupling assembly according to any one of the above-mentioned embodiments.

An exemplary advantage of the inventive driveline assembly includes that the propeller shaft with all its rotating components, more particularly also the bearing mechanism can be uncoupled from the drive unit and the transfer case. In the uncoupled condition, the propeller shaft is stationary, so that there occur no undesirable drag moments or friction losses. More particularly, the coupling assembly also permits the uncoupling of the assemblies drivingly connected to the propeller shaft at the input end and at the output end for torque transmitting purposes, for example angle drives, which, again, due to reduced drag moments and reduced friction forces, leads to a reduction in power losses.

BRIEF DESCRIPTION OF THE DRAWINGS

Below, exemplary embodiments will be explained with reference to the drawings wherein.

DETAILED DESCRIPTION

Figure 1A:
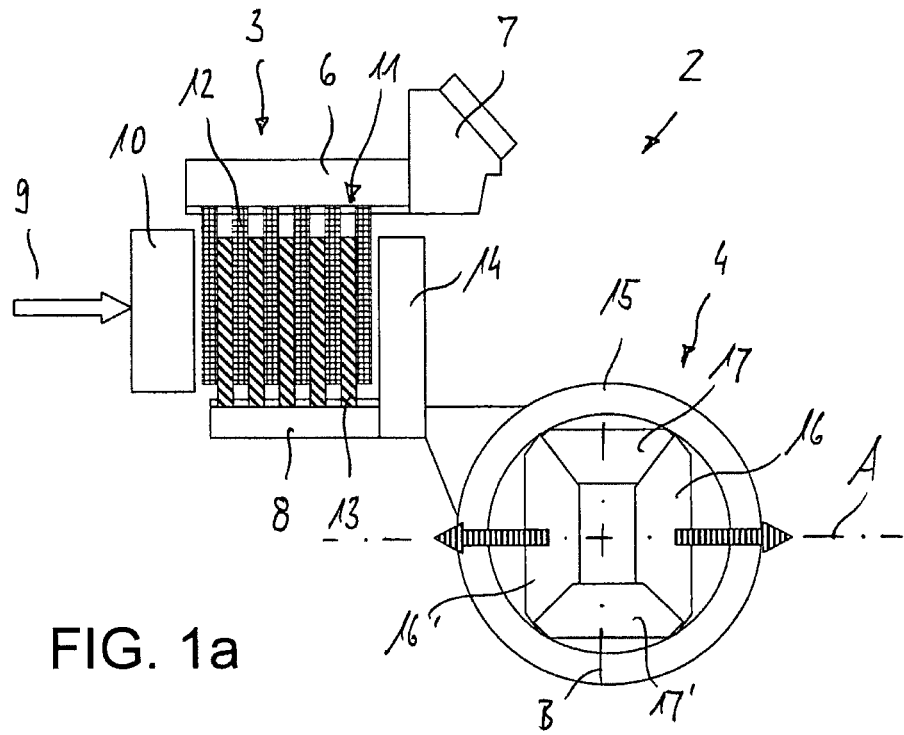
FIG. 1 is an inventive coupling assembly in a first embodiment in half a longitudinal section, showing the following design principles:
 a) in a non-actuated condition
 b) in an actuated condition.

FIGS. 1 to 12 will initially be described jointly as far as their common features are concerned. These figures each show a coupling assembly 2 which serves to couple and uncouple a driving axle to a propeller shaft of a motor vehicle and so set the distribution of torque for said driving axle as required. The coupling assembly 2 comprises, in the form of assemblies, a friction coupling 3 and a differential drive 4 which are connected in series as regards the torque flow, with a clutch 41 being provided between the friction coupling 3 and the differential drive 4.

The friction coupling 3 comprises a coupling input part 6 which, for the purpose of introducing torque into the coupling assembly 2, is firmly connected to a ring gear 7, as well as a coupling output part 8 which serves to drive the differential drive 4. Furthermore, the differential assembly 3 comprises an axial setting device 9 which is not shown in the sketches, giving the design principles and which is symbolized merely by an arrow.

In one exemplary arrangement, the friction coupling 3 is provided in the form of a multi-plate coupling and comprises outer plates 12 which are connected to the coupling input part 6 in a rotationally fixed and axially displaceable way, as well as inner plates which are connected to the coupling output part 8 in a rotationally fixed and axially displaceable way. To that extent the coupling input part 6 of the friction coupling 3 forms the outer plate carrier and the coupling output part 8 forms the inner plate carrier. When the axial setting device is actuated, the plate package 11 formed of the outer plates 12 and the inner plates 13 arranged axially alternately thereto is loaded via a first pressure plate 10 in the closing sense, with the plate package 11 being axially supported against a supporting plate 14 which can be firmly connected to the coupling input part 6 or to the coupling output part 8. By loading the plate package 11, the coupling output part 8, as a result of the friction locking connection between the outer plates 12 and the inner plates 13, is coupled to the coupling input part 6, so that torque can be transmitted from the ring gear 7 to the differential drive 4.

The differential drive 4 comprises an input element 15 which can be driven by the coupling output part 8 so as to be rotatable around the axis of rotation A. Furthermore, a first and a second sideshaft gear 16, 16' which are supported relative to the input element 15 so as to be rotatable around the axis of rotation A, as well as a plurality of differential gears 17, 17', which are supported so as to be rotatable around radial axes of rotation B in the input element 15, engage the sideshaft gears 16, 16' and rotate together with the input element 15 around the axis of rotation A. The differential gears 17, 17' are normally held by journals 18 in the input element 15 so as to rotate around their individual axes of rotation B. To that extent, the input element 15 can also be referred to as the carrier element or differential carrier. For the purpose of transmitting torque to the wheels of the driving axle, sideshafts (not illustrated) are connected in a rotationally fixed way to the sideshaft gears 16, 16', for example by longitudinal teeth 19. The carrier element 15 is rotatably supported on the axis of rotation A inside the housing 20, with the housing 20 being firmly connected to the coupling input part 6 and, more particularly it is produced so as to be integral therewith.

In principle, the axial setting device 9 can be used in the form of any kind of actuator for generating an axial force. These can be actuated mechanically, hydraulically or pneumatically. As far as mechanical actuators are concerned, more particularly, an electromotive or electromagnetic actuation can be considered. In one exemplary embodiment, the axial setting device 9 is provided in the form of a ball ramp assembly which permits a sensitive kind of control and is axially short.

As shown in FIGS. 2, 3, 4, 6, 9 and 11 for example, the ball ramp assembly comprises two discs 22, 23 which are arranged so as to be centred on the axis of rotation A. The first one of the discs is provided in the form of a supporting disc 22 which is axially supported relative to a stationary component such as the housing 20. The second disc is provided in the form of an axially displaceable setting disc. As can be seen in the detailed drawings, the two discs 22, 23, on their end faces facing one another, each comprise a plurality of circumferentially distributed, circumferentially extending ball grooves whose depths vary in opposite directions. In each pair of opposed ball grooves 24, 25 there is received a ball via which the two discs 22, 23 support one another. Axially between the two discs 22, 23 there is provided an annular-disc-shaped cage 26 with circumferentially distributed windows. In each window there is received one of the balls which are thus held in the circumferential direction in a defined position relative to one another. One of the discs 22, 23 is rotatingly drivable by an electric motor (not illustrated) whereas the other one of the two discs 23, 22 is rotationally fixed.

In the starting condition, i.e. when the friction coupling 3 is fully open, the two discs 22, 23 are in the nearest position relative to one another. When the drivable disc 22 is rotated, the pairs of ball grooves 24, 25 rotate relative to one other, so that the balls move into regions of a lower depth. The discs 22, 23 are thus spread apart, with the setting disc 23 being axially displaced towards the friction coupling 3.

On its rear side, the setting disc 23 comprises a radial pressure face which, via an intermediate axial bearing 27, axially loads a pressure disc 28. The pressure disc 28, in turn, acts on pressure elements 29 which axially pass through the housing 20 and, via the pressure plate 10, load the plate package 11. The actuation of the ball ramp assembly 9 thus leads to a predetermined locking of the friction coupling 3 and thus to the differential drive 4 being coupled to the driveline. For again opening the friction coupling 3, the electric motor is actuated in the opposite direction, with pressure springs 30, which are axially supported on the housing 20 and which at least indirectly support the setting disc 23, causing the return of the setting disc 23 towards the supporting disc 22.

Below, there will follow a description of the specific and exemplary features of the different embodiments.

In the embodiments according to FIGS. 1 to 4, the coupling output part 8 is permanently drivingly connected to the carrier element 15 of the differential drive 4. This means that the coupling output part 8 and the carrier element 15 are firmly connected to one another, preferably produced so as to be integral with one another. However, they can initially also be produced as separate components and subsequently connected to one another, for instance by welding. Below, FIG. 2, which also stands for FIGS. 3 and 4, will be explained. Identical components and those which correspond to one another will be given the same reference numbers with the subscript "2".

Figure 2:
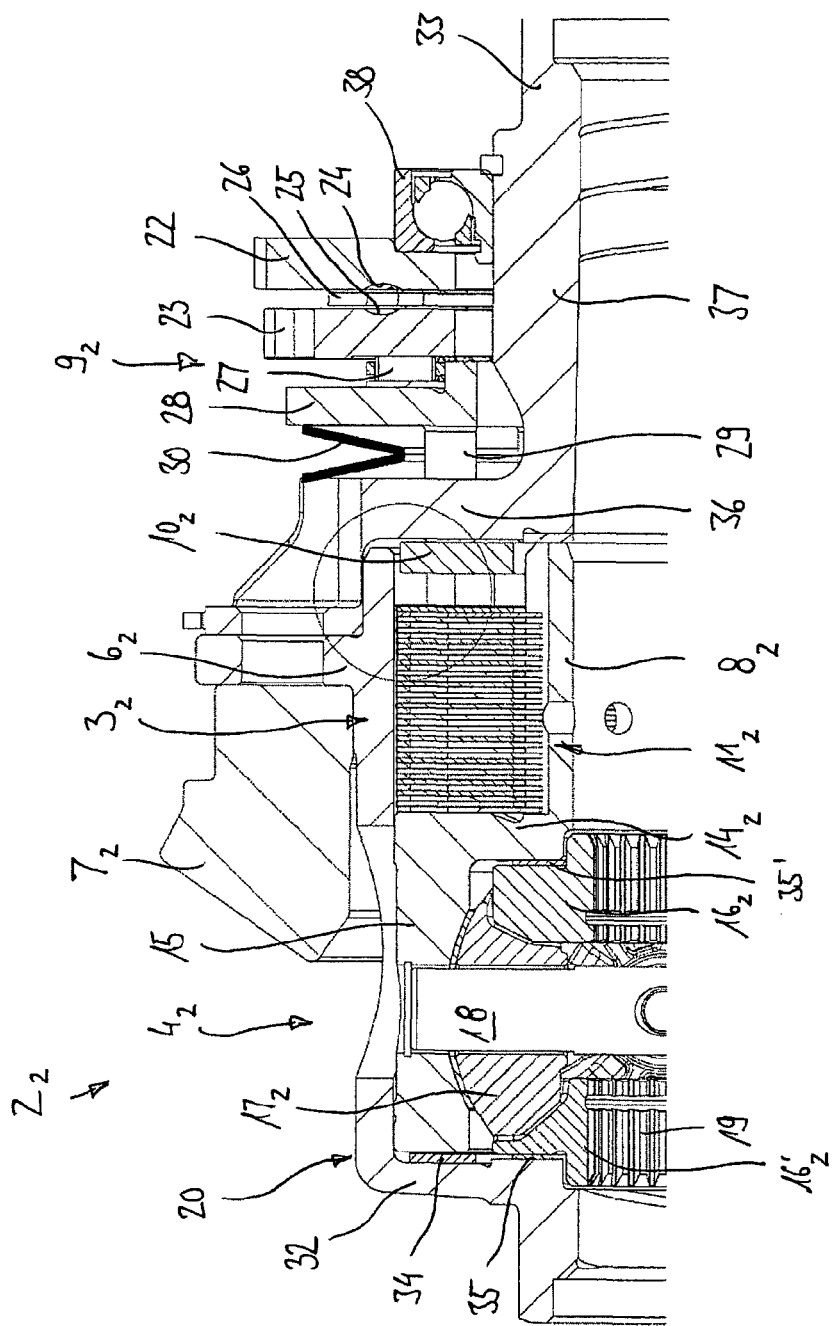
FIG. 2 shows an inventive coupling assembly according to FIG. 1, giving details in half a longitudinal section in a first embodiment.

In the detailed drawing according to FIG. 2, it can be seen that the coupling input part $6_2$ is firmly connected to a housing 20 of the coupling assembly $2_2$. The housing 20 is provided in two parts and comprises a cup-shaped first part 32 which, at the same time, forms the coupling input part $8_2$ and in which there is received the friction coupling $3_2$ and the differential drive $4_2$ as well as a cover-shaped second part 33 which is connected thereto and which, via a threaded connection (not illustrated), is firmly connected to the first part 32. The cup-shaped first housing part 32 comprises a radial portion against which the carrier element $15_2$ is axially supported via a stop disc 34. Equally, the sideshaft gear $16'_2$ shown on the left in the present illustration is axially supported relative to the first housing part 32 via a stop disc 35. The righthand sideshaft gear $16_2$ arranged opposite is axially supported relative to a radial face of the carrier element $15_2$ via a stop disc 35'. The second housing part 33 comprises a flange portion 36 which is axially penetrated by the pressure elements 29, as well as an integrally adjoining sleeve portion 37 on which the axial setting device $9_2$ is arranged so as to extend coaxially relative to the axis or rotation A. It can be seen that the supporting disc 22 of the axial setting device $9_2$ is axially supported by a rolling contact bearing 38 relative to the sleeve portion 37 of the second housing part 33.

Figure 3:
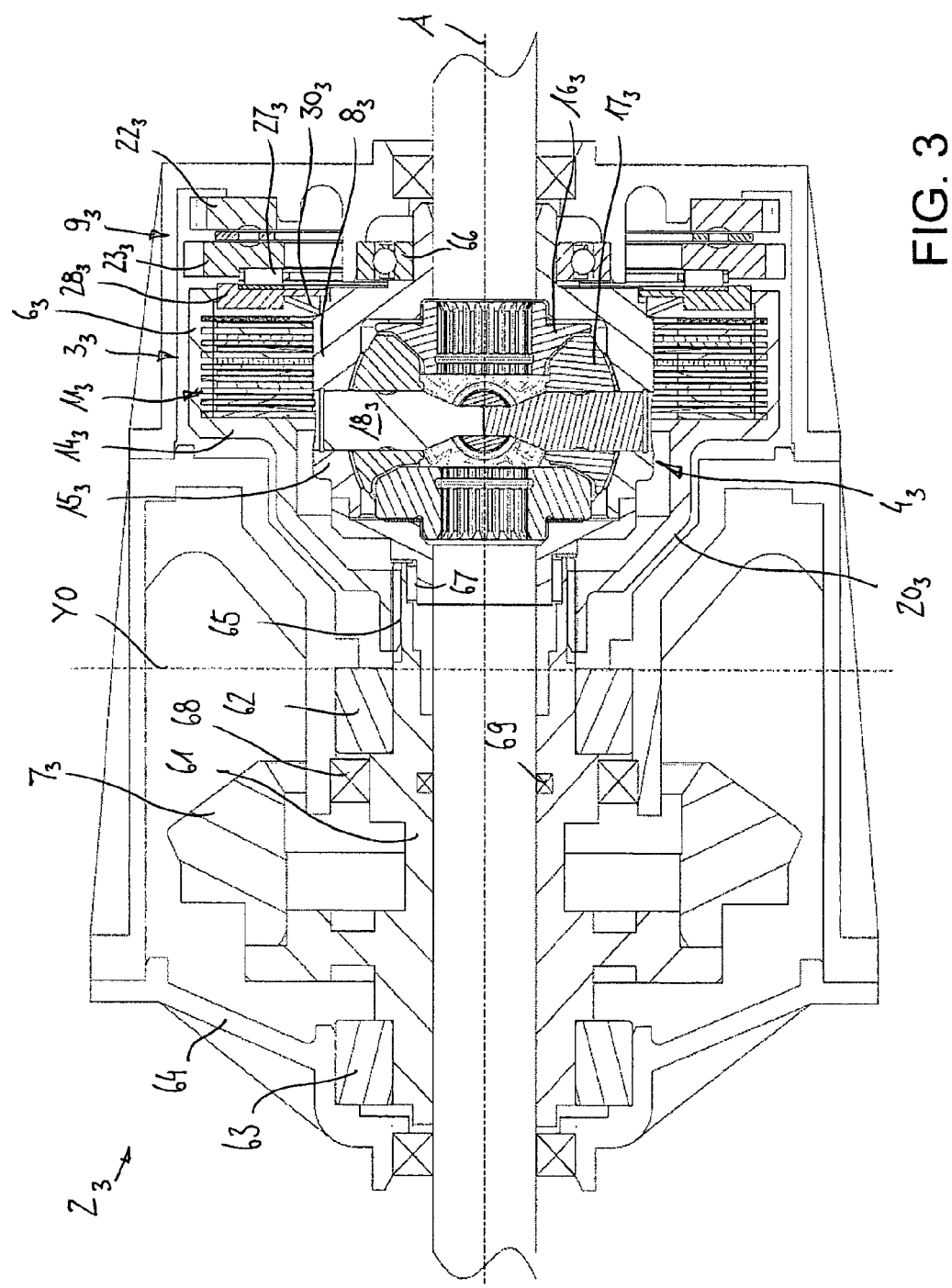
FIG. 3 shows an inventive coupling assembly according to FIG. 1, giving details in a longitudinal section in a second embodiment.

The embodiment according to FIG. 3 largely corresponds to that shown in FIG. 2, so that, as far as common features are concerned, reference is made to the above description. Identical components or components corresponding to one another have been given the same reference numbers with the subscript 3.

An exemplary feature of the present coupling assembly according to FIG. 3 is in that, with reference to the central vehicle plane Y0, the axial setting device $9_3$, the friction coupling $3_3$, and the differential drive $4_3$ are all arranged on the same side. The ring gear $7_3$, with reference to the central vehicle plane Y0, is arranged on the opposite side, so that the available installation space is used advantageously. More particularly, this configuration applies to integrating the coupling assembly $2_3$ in the rear axle of the motor vehicle. A further advantage of this exemplary configuration includes that the sideshafts connected to the wheels of the motor vehicle can be provided in identical lengths. It can be seen that the ring gear $7_3$ is firmly connected to an intermediate shaft 61 which, by bearings 62, 63, is rotatably supported in the drive housing 64 so as to extend coaxially relative to the axis of rotation A. The intermediate shaft 61 is connected in a rotationally fixed way to the coupling input part $6_3$ by longitudinal teeth 65.

In the present embodiment, the coupling input part $6_3$ is provided in the form of a coupling carrier in which there is received the plate package $11_3$ and the differential drive $4_3$. The plate package $11_3$ is positioned radially outside the coupling output part $8_3$, respectively the differential carrier $15_3$. The differential carrier $15_3$ on one side is supported by a rolling contact bearing 66 relative to the drive housing 64 and on the other side by a rolling contact bearing 67 relative to the intermediate shaft 61 so as to be rotatable around the axis of rotation A. The axial setting device $9_3$ is arranged so as to axially adjoin the friction coupling $3_3$ on the side facing away from the longitudinal vehicle plane Y0. In the present embodiment, the axial setting device $9_3$ is also provided in the form of a ball ramp assembly, and like in the other embodiments, there can also be provided a hydraulic actuating device instead.

A further exemplary feature of the present embodiment includes that there is provided sealing members 68, 69 which divide the entire assembly into two chamber systems. There is formed a first chamber system in which there is arranged the driving pinion and the ring gear $7_3$, and a second sealing system in which there are arranged the friction coupling $3_3$ and the differential drive $4_3$. This, in turn, makes it possible to use two different lubricants which are individually adapted to the individual requirements. In addition, in driving conditions in which drag losses have to be minimized, the oil level can be lowered, which again leads to a reduction in the performance losses.

Figure 4:
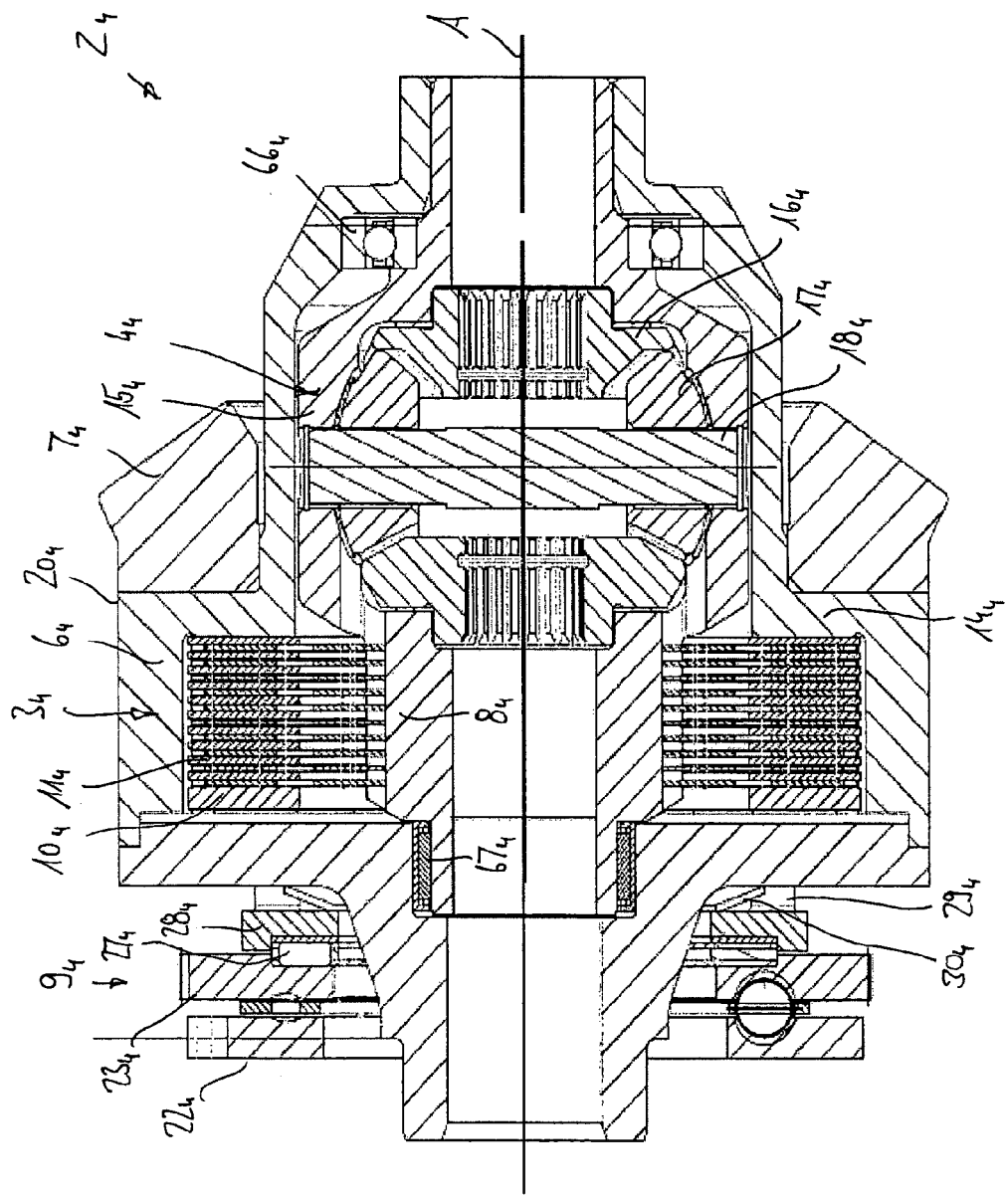
FIG. 4 shows an inventive coupling assembly according to FIG. 1, giving details in a longitudinal section in a third embodiment.

The embodiment according to FIG. 4 largely corresponds to those according to FIGS. 2 and 3, so that as far as common characteristics are concerned, reference is made to the above description. Identical components and those corresponding to one another have been given the same reference numbers provided with the subscript 4.

In the present embodiment, the friction coupling $3_4$ is arranged so as to axially adjoin the differential drive $4_4$, with the plate package $11_4$ being arranged so as to partially radially overlap with the differential gears $17_4$. The ring gear $7_4$ is arranged approximately in the plane formed by the journals $18_4$ of the differential gears $17_4$. Apart from that, the present coupling assembly corresponds to the above-mentioned coupling assemblies in respect of construction and function.

FIG. 5 shows an inventive coupling assembly $2_5$ in the form of a further embodiment shown schematically giving design principles. In many parts, this embodiment corresponds to that shown in FIG. 1, so that, as far as common features are concerned, reference is made to the above description. Identical components and those corresponding to one another have been given the same reference numbers provided with the subscript 5.

In the present coupling assembly $2_5$ the coupling output part $8_5$ is axially displaceably held relative to the coupling input part $6_5$ and can be axially loaded by the axial setting device $9_5$. Furthermore, the special feature of the present embodiment includes a form-fitting clutch 41 which is arranged in series between the friction coupling $3_5$ and the differential drive $4_5$. It is the function of the form-fitting clutch 41 to uncouple all the rotating elements positioned upstream of the differential drive 45 from the driveline. This measure ensures that the drag moments and the friction losses are reduced. The form-fitting clutch 41 comprises a first clutch part 42 which is firmly connected to the coupling output part $8_5$, and a second clutch part 43 which is firmly connected to the carrier element $15_5$ of the differential drive $4_5$, which can be made to engage one another in a form-fitting way for transmitting torque. "Form-fitting" in this context refers to a rotationally fixed connection which is produced by the first clutch part and the second clutch part engaging one another. Examples of form-fitting clutches include a dog clutch, a claw coupling or a toothed coupling. In the exemplary clutch 41 illustrated, the form-fitting connection is achieved by longitudinal toothings which can be axially inserted into one another.

Figure 5A:
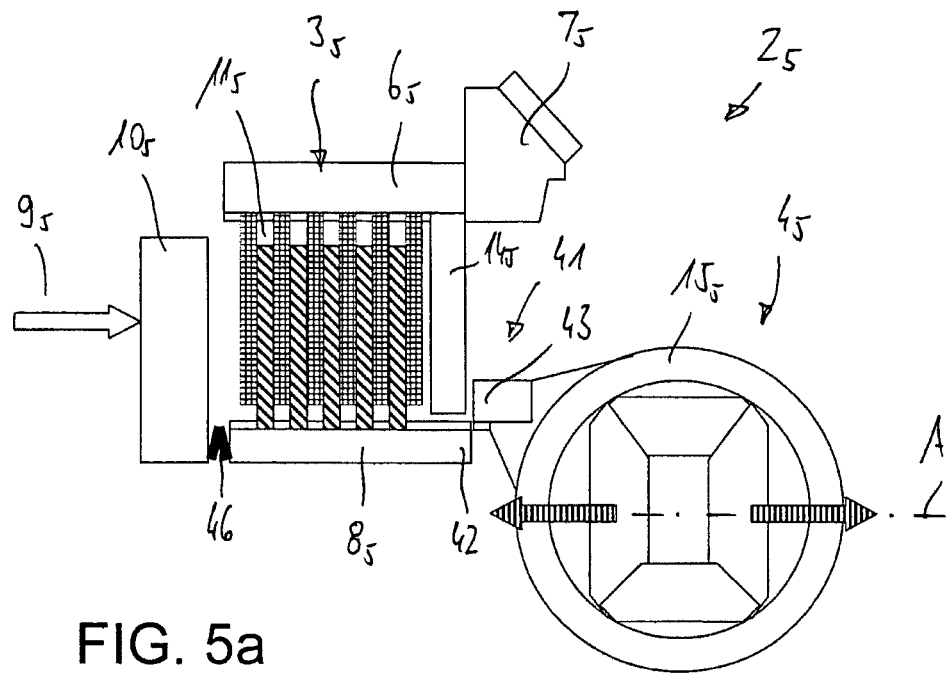
FIG. 5 shows an inventive coupling assembly in a further embodiment, giving design principles in half a longitudinal section:
 a) in a non-actuated condition,
 b) in an intermediate position with a closed clutch, and
 c) in the actuated condition of the friction coupling.
Figure 5B:
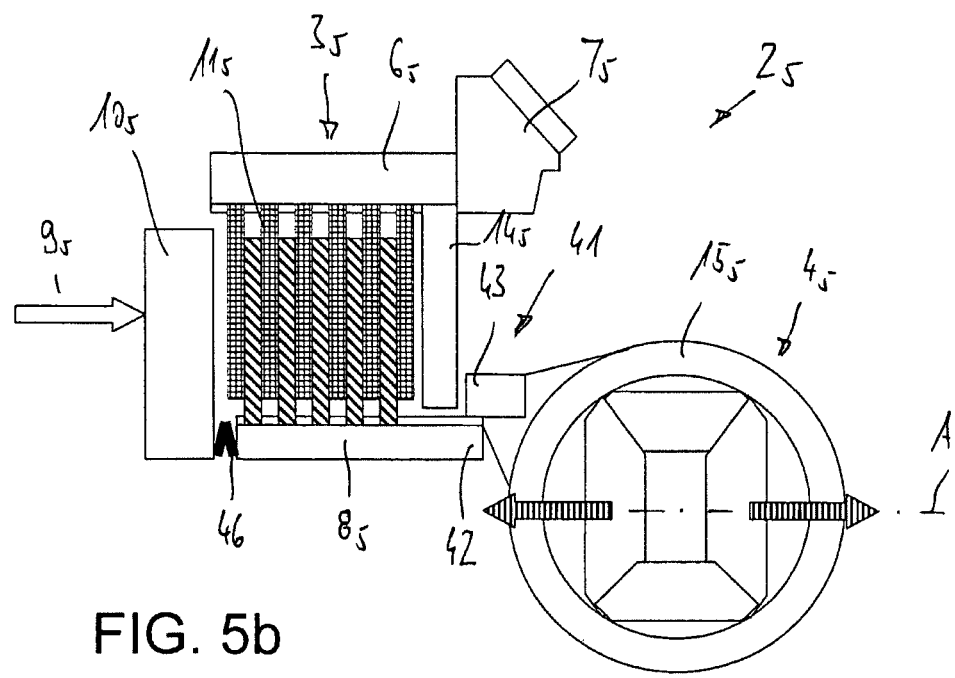
Figure 5C:
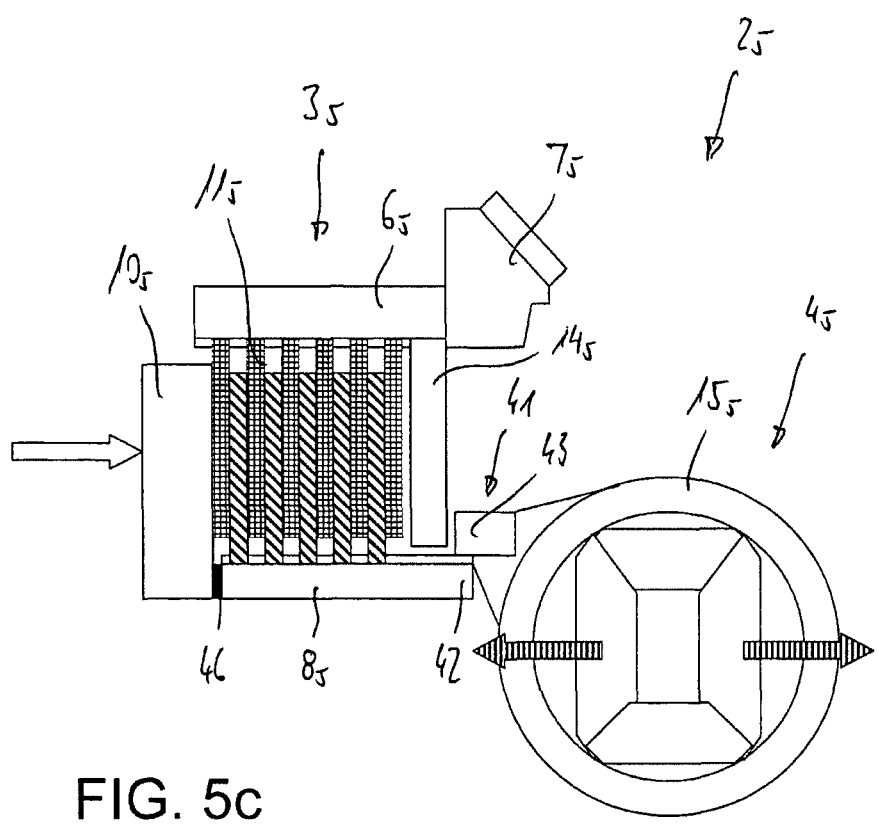

The mode of functioning of the present embodiment with the clutch 41 will be explained below with reference to FIGS. 5a to 5c. FIG. 5a shows a coupling assembly $2_5$ in the non-actuated condition of the axial setting device $9_5$. The pressure plate $10_5$ has axial play relative to the plate package $11_5$ so that the coupling input part $6_5$ and the coupling output part $8_5$ are uncoupled from one another. By actuating the axial setting device $9_5$ to a limited extent, the pressure plate $10_5$ is axially loaded, which pressure plate $10_5$ axially displaces the coupling output part $8_5$ via the spring member 46. Said axial displacement of the coupling output part $8_5$ causes the first and the second clutch part 42, 43 of the form-fitting clutch 41 to engage one another, which is illustrated in FIG. 5b. In this condition, the friction coupling $3_5$ can not yet transmit any torque. Only by continuing to axially load the pressure plate $10_5$ by use of the axial setting device $9_5$ is the plate package $11_5$ loaded, so that the torque to be transmitted between the coupling input part $6_5$ and the coupling output part $8_5$ can be set. This condition is illustrated in FIG. 5c.

An exemplary advantage of the present embodiment according to FIG. 5 includes that when the clutch $41_5$ is open, not only are the coupling input part $6_5$ of the friction coupling $3_5$ and the components positioned in the torque flow upstream, i.e. in front of same are uncoupled from the rear axle, but also the coupling output part $8_5$ of the friction coupling $3_5$. In this way, the drag moments and friction losses are again reduced, which has an advantageous effect on the fuel consumption of the motor vehicle.

Figure 6:
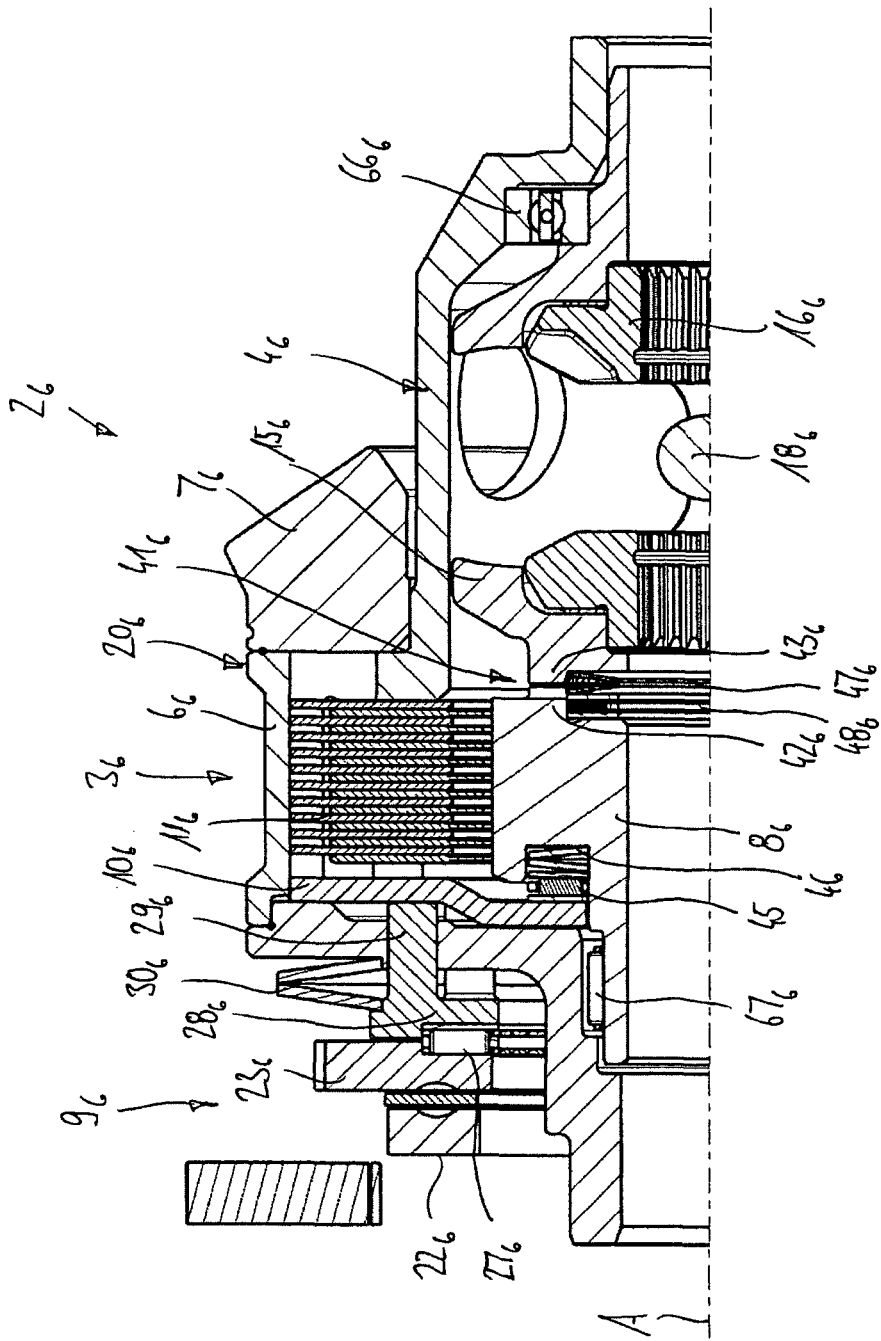
FIG. 6 shows an inventive coupling assembly according to FIG. 3, giving design principles and details in half a longitudinal section.

FIG. 6 shows an inventive coupling assembly $2_6$ in a further exemplary embodiment which functions in accordance with the principle explained in FIG. 5. To that extent, as far as construction and mode of functioning are concerned, reference is made to the above description of FIG. 5. In addition, the present embodiment largely corresponds to that shown in FIG. 2, to the description of which reference is also made. Identical components and those corresponding to one another have been given the same reference numbers provided with the subscript 6. Below, largely only the differences will be described.

It can be seen that the form-fitting connection of the clutch $41_6$ in the present embodiment is put into effect by a Hirth toothing. The Hirth toothing comprises, as the first clutch part $42_6$, first teeth in an end face of the coupling output part $8_6$, and, as second clutch part $43_6$, opposed second teeth in a corresponding end face of the carrier element $15_6$. The axial setting device $9_5$ which is also provided in the form of a ball ramp assembly, has two functions. On the one hand, the pressure elements $29_6$ indirectly load the coupling output part $8_6$ towards the carrier element $15_6$, so that the clutch $41_6$ is closed. The transmission of power takes place via the pressure plate $10_6$ which is held in the housing $20_6$ coaxially relative to the axis of rotation A and so as to be axially displaceable, as well as an axial bearing 45 and spring member 46. The spring member 46 is provided in the form of plate springs which are received in a radial recess of the coupling output part $8_6$. The coupling output part $8_6$ is supported by a radial bearing $67_6$ relative to the housing $20_6$ so as to be rotatable around the axis of rotation A. For returning the first part $42_6$ of the clutch $41_6$ relative to the carrier element $15_6$ there are provided further spring members $47_6$ which axially load the coupling outer part $8_6$ in the non-actuated condition towards the axial setting device $9_6$. The spring member $47_6$ is axially supported against an axial bearing 48 in the form of a needle bearing which is received in a recess of the coupling output part $8_6$ and is axially supported relative to same.

Figure 7:
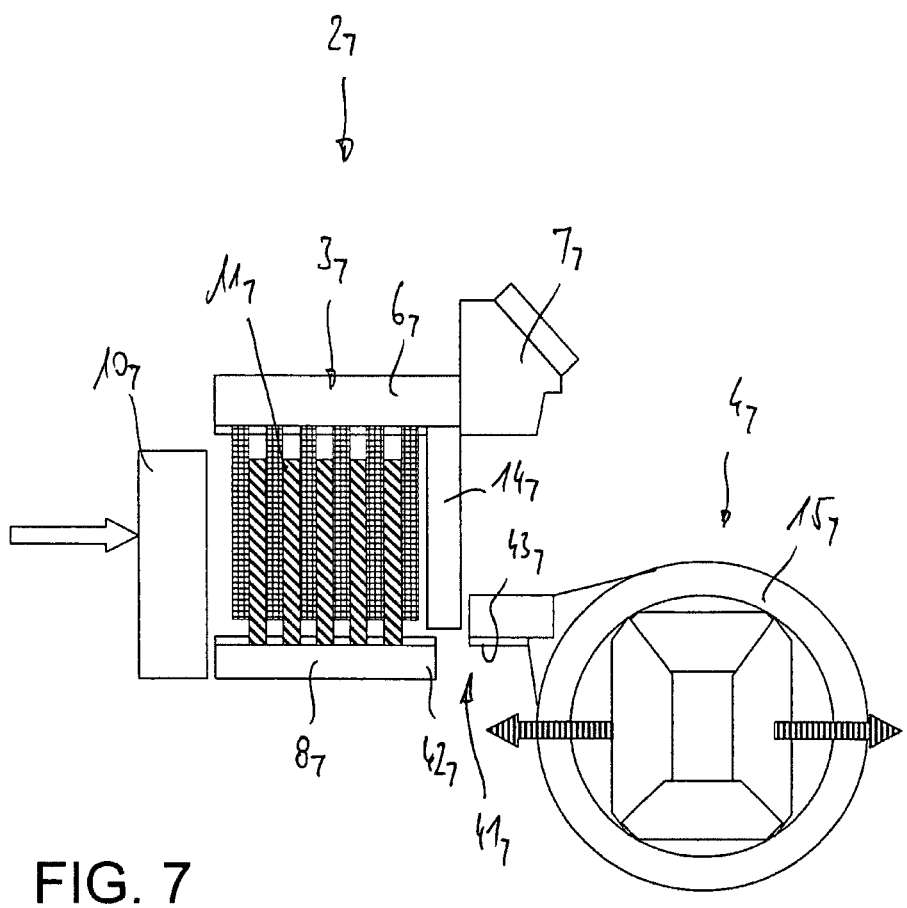
FIG. 7 shows an inventive coupling assembly in a modified embodiment, giving design principles in half a longitudinal section.

FIG. 7 shows an inventive coupling assembly 2 in a form which is slightly modified relative to that shown in FIG. 5. To that extent, as far as common features are concerned, reference is made to the above description. The only difference between the exemplary arrangements, is in that in the present coupling assembly there are not provided any first springs in the form of return springs between the pressure plate $10_7$ and the coupling output part $8_7$. The return action in this case takes place by actuating the axial setting device.

FIG. 8 shows an inventive coupling assembly $2_8$ in a further exemplary embodiment schematically giving the design principles. This embodiment largely corresponds to that according to FIG. 5 so that, as far as common features are concerned, reference is made to the above description, with identical components or components corresponding to one another having been given the same reference number with the subscript "8".

Figure 8A:
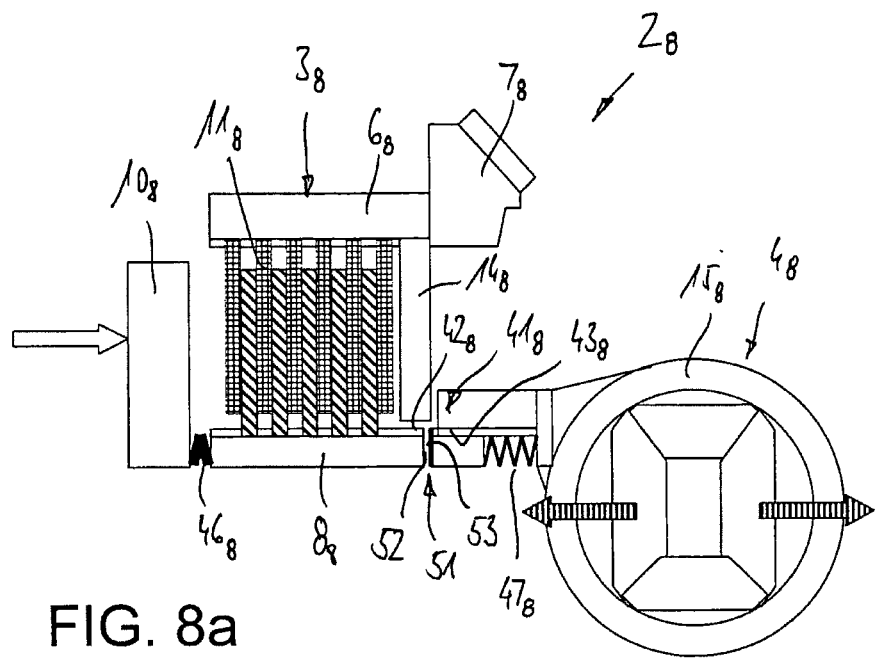
FIG. 8 shows an inventive coupling assembly in a further embodiment, giving design principles in half a longitudinal section:
 a) in a non-actuated condition,
 b) in a first intermediate position with an actuated synchronising unit,
 c) in a second intermediate position with a closed clutch, and
 d) in the actuated condition of the friction coupling.
Figure 8B:
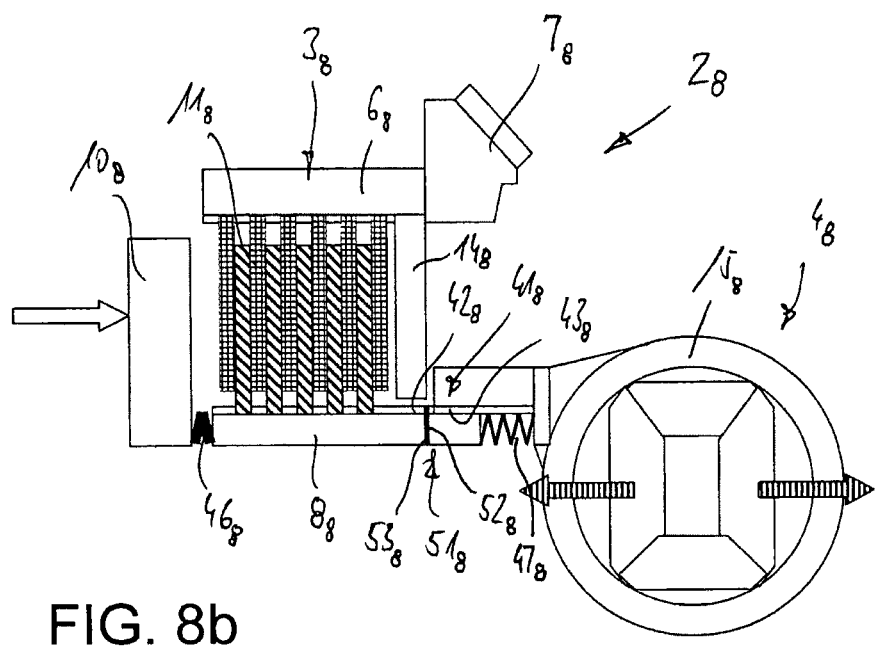
Figure 8C:
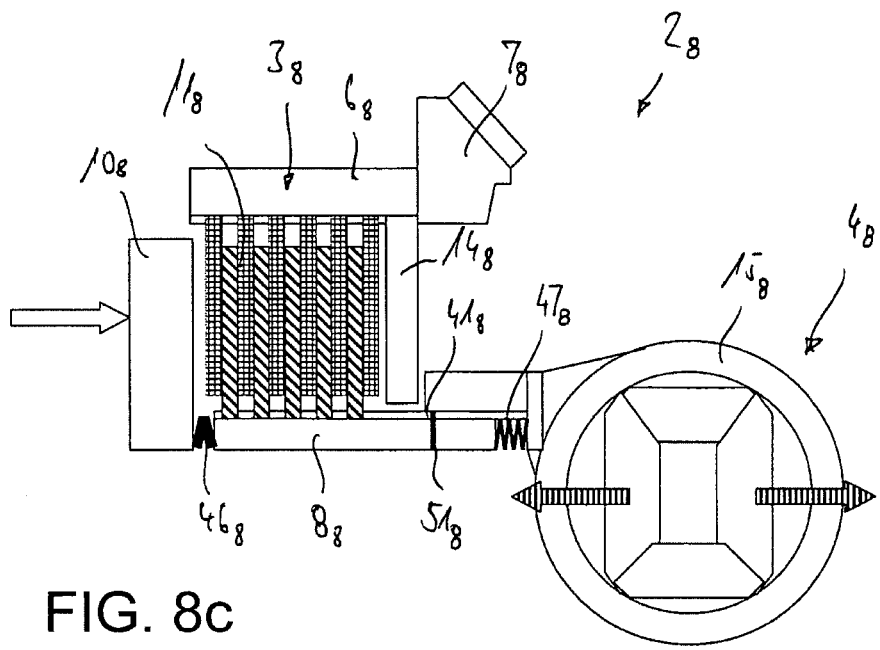
Figure 8D:
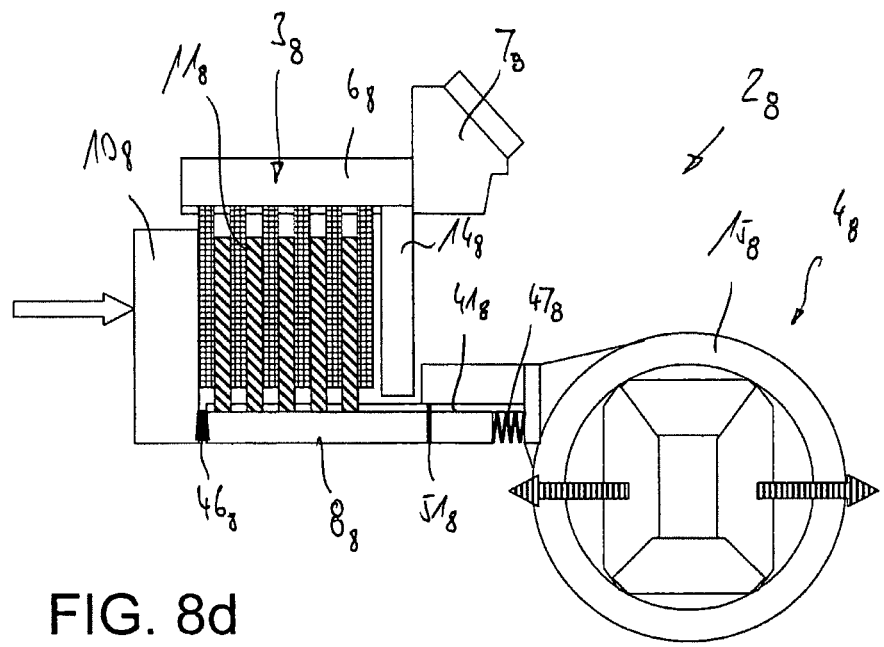

An exemplary characteristic of the coupling assembly $2_8$ includes that, in addition to the form-fitting clutch $41_8$, there is provided a synchronizing unit 51 which is arranged in the torque flow between the coupling output part $8_8$ and the carrier element $15_8$ of the differential drive $4_8$. The function of the synchronizing unit 51 which in this embodiment is provided in the form of paired friction faces at the respective components $8_8$, $15_8$ is to effect a speed adjustment between the carrier element $15_8$ and the coupling output part $8_8$ before the clutch $41_8$ is closed. The synchronizing unit 51 is again actuated by the axial setting device $9_8$ via the pressure plate $10_8$. When the axial setting device is actuated, the pressure place $10_8$ is axially loaded towards the coupling output part $8_8$ and the plate package $11_8$, which is shown in FIG. 8a. The friction face 52 which is formed at the coupling outer part $8_8$ or on a component connected thereto establishes a friction contact with an opposed second friction face 53 which is formed on the carrier element $15_8$ or on a component connected thereto for the purpose of transmitting torque. In this way, the speed of the coupling output part $8_8$ is adapted to the speed of the carrier element $15_8$ through friction locking. This condition is shown in FIG. 8b. After the speed of the coupling output part $8_8$ has at least partially been adapted to the speed of the carrier element $15_8$, the form-fitting clutch $41_8$, for the purpose of transmitting torque between the coupling outer part $8_8$ and the carrier element $15_8$ is closed by further loading the coupling output part $8_8$ by the axial setting device. This is shown in FIG. 8c. In this condition, the driving axle rotates jointly with the coupling output part $8_8$, so that by actuating the axial setting device $9_8$ accordingly, the friction coupling $3_8$ can be actuated as required in order to transmit a desired amount of torque to the driving axle.

An exemplary advantage of the present embodiment with the synchronizing unit 51 according to FIG. 8 is that, starting from the open condition, with the axial setting device being actuated by the synchronizing unit 51, first there is generated a friction locking effect between the coupling output part $8_8$ and the carrier element $15_8$. In this way, the masses of the coupling output part $8_8$ and of the inner plates connected thereto in a rotationally fixed way are adapted to the speed of the carrier element $15_8$, i.e. they are synchronized or partially synchronized depending on the set speed. In contrast to the embodiments according to FIGS. 5 and 6, any noise and wear problems during the subsequent switching operation of the form-fitting clutch $41_8$ are greatly reduced while the first and the second coupling part engage one another. If technically required, the axial setting device can be set in such a way as to ensure complete synchronization of the coupling outer part $8_8$ and the carrier element $15_8$ prior to the clutch $41_8$ being switched. In this way, any noise and wear problems can be nearly excluded altogether. In the embodiments mentioned, the friction coupling 38 is only activated after the engagement of the form-fitting clutch $41_8$. This is advantageous in that neither the synchronizing action nor the switching operation of the clutch have to overcome large amounts of mass inertia. This means that under operating conditions with high differential speeds switching can take place without the development of loud noise and with reduced wear.

Figure 9:
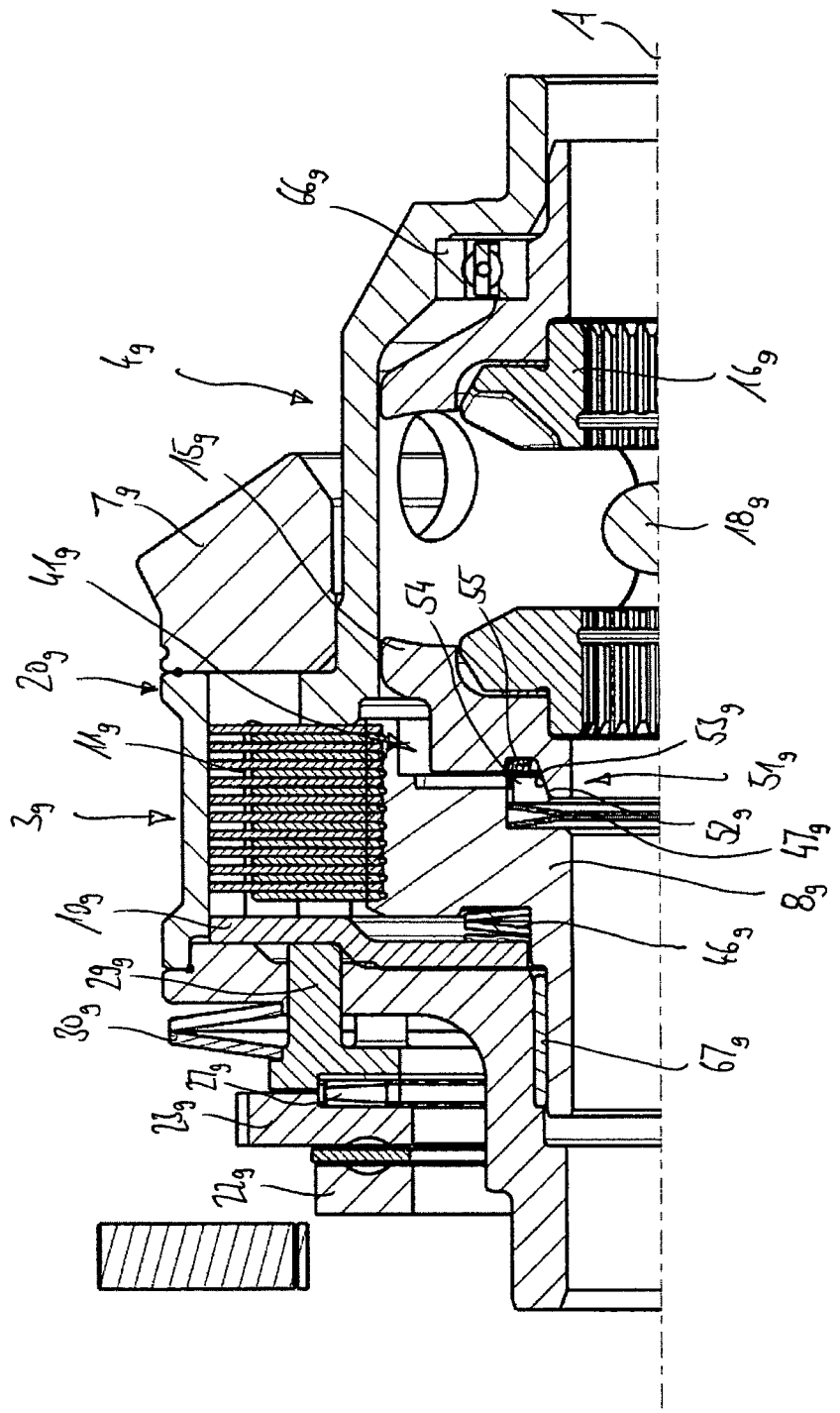
FIG. 9 shows an inventive coupling assembly according to the design principles as given in FIG. 8, giving details in half a longitudinal section.

FIG. 9 shows an exemplary arrangement of an inventive coupling assembly $2_9$ in a further embodiment which operates in accordance with the principles explained in connection with FIG. 8. To that extent, as far as construction and mode of functioning are concerned, reference is made to the above description of FIG. 8. In addition, the present embodiment largely corresponds to that shown in FIG. 6 to the description of which reference is also made, with identical components or components corresponding to one another having been given the same reference number with the subscript "9". Below, substantially the differences will be explained.

In the embodiment according to FIG. 9, the synchronizing unit $51_9$ comprises a separate friction element 54 which is connected in a rotationally fixed way to one of the two components $8_9$, $15_9$ and which is axially displaceable relative to the other one of the two components $15_9$, $8_9$. The friction element 54 is preferably provided in the form of a ring with a conical friction face. The friction element 54 is positioned in an inner recess of the coupling output part $8_9$, and it is axially supported relative to a radial face of the coupling output part $8_9$ by a spring member $47_9$.

Figure 10:
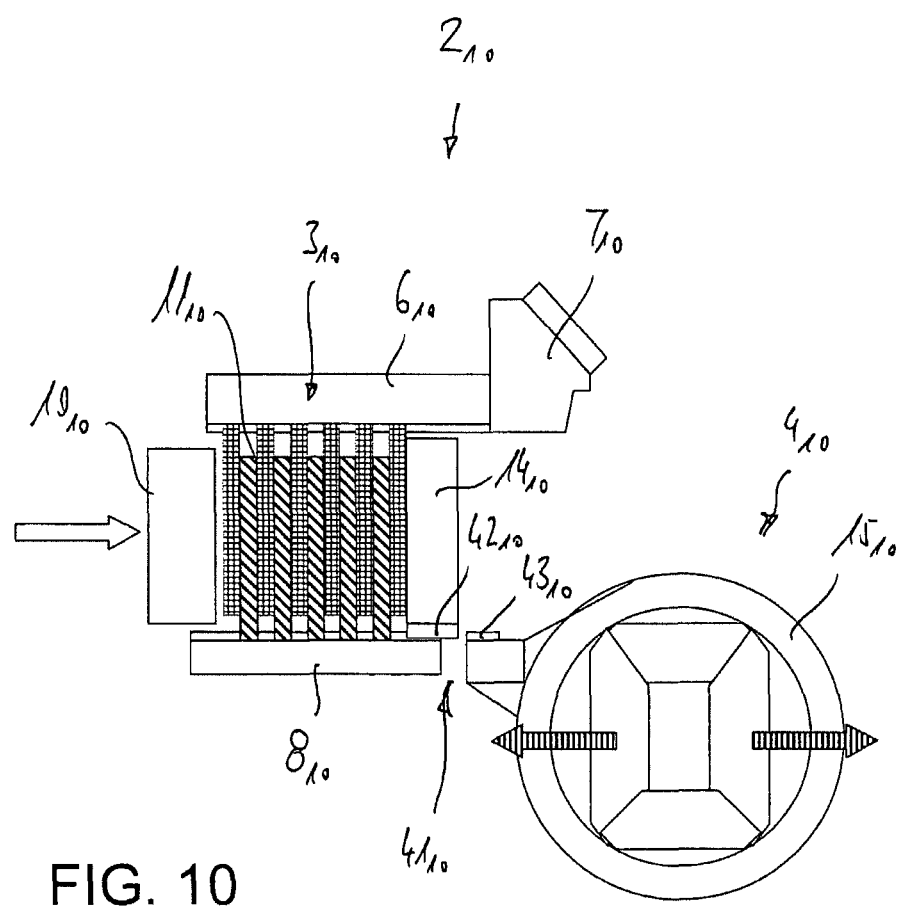
FIG. 10 shows an inventive coupling assembly in a further embodiment giving design principles in half a longitudinal section.

FIG. 10 shows an inventive coupling assembly $2_{10}$ in a further exemplary embodiment schematically, giving design principles. This embodiment largely corresponds to that shown in FIG. 5 so that as far as joint characteristics are concerned, reference is made to the above description, with identical components or components corresponding to one another having been given the same reference number with the subscript "10".

The present coupling assembly $2_{10}$ is characterized in that the form-fitting clutch $41_{10}$ is provided between the supporting plate $14_{10}$ and the carrier element $15_{10}$ or to a component firmly connected thereto. The supporting plate $14_{10}$ is connected to the coupling output part $8_{10}$ in a rotationally fixed and axially displaceable way and, when the axial setting device $9_{10}$ is actuated, the supporting face $14_{10}$ can be axially displaced towards the carrier element $15_{10}$. In the present embodiment, the form-fitting clutch $41_{10}$ is provided in the form of a toothed coupling with longitudinal toothing.

When the friction coupling $3_{10}$ is open, the coupling output part $8_{10}$ rotates jointly with the coupling input part $6_{10}$ so that any drag losses in the plate package are avoided. An exemplary feature of the present embodiment includes that, as compared to the above embodiments, the form-fitting clutch $41_{10}$ and the friction coupling $3_{10}$ are actuated in series. The force acting on the form-fitting clutch $41_{10}$ corresponds to the force acting on the plate package of the friction coupling $3_{10}$. Said axial force applied via the axial setting device $9_{10}$ to the friction coupling $3_{10}$ is transmitted to the supporting plate so that the toothing of the supporting plate is made to engage the respective counter toothing of the carrier element $15_{10}$. In the process, the axial resistance forces from the clutch $41_{10}$, the spring returning forces of the clutch and the tooth flank friction are added up. This compression force, which is also present in the plate package of the friction coupling $3_{10}$ leads to a certain coupling moment in the friction coupling and thus to a force-locking effect relative to the housing to which the ring gear $7_{10}$ is fixed. As the form-fitting clutch is thus subjected by the mass inertia forces of the coupling input part $6_{10}$ and also of the propeller shaft, the present embodiment is particularly suitable for applications where the switching operation requires only small speed differentials.

Figure 11:
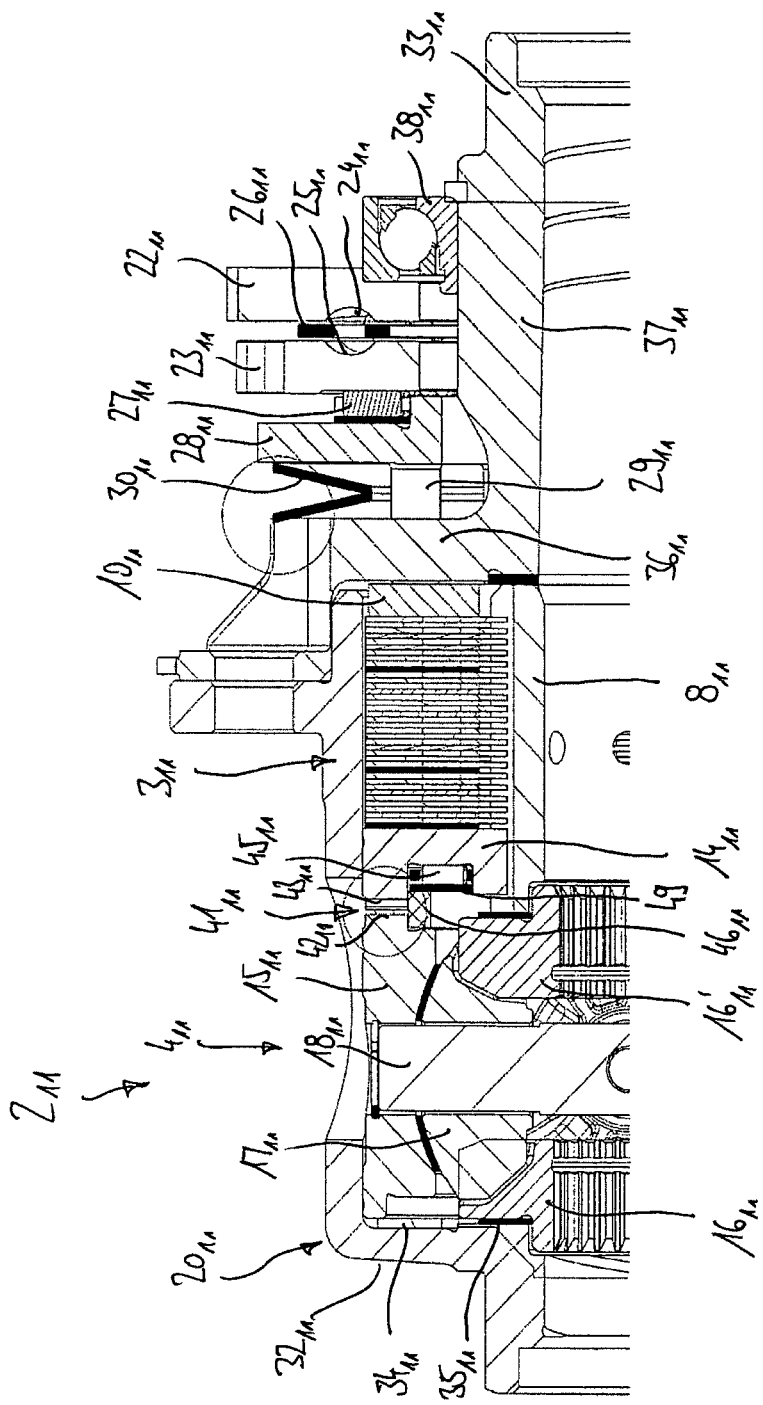
FIG. 11 shows an inventive coupling assembly according to the design principles of FIG. 10, giving details in half a longitudinal section.

FIG. 11 shows another exemplary inventive coupling assembly $2_{11}$ in a further embodiment which, in respect of construction and mode of functioning, corresponds to the embodiment according to FIG. 10. To that extent, reference is made to the above description of FIG. 10. In addition, the present embodiment largely corresponds to that shown in FIG. 2 to the description of which reference is also made, with identical components or components corresponding to one another having been given the same reference number with the subscript "11". Below, substantially only the differences will be described.

In the embodiment according to FIG. 11, the form-fitting clutch $41_{11}$ is provided in the form of a toothed coupling with face toothing. Between the supporting plate $14_{11}$ and the carrier element $15_{11}$ there is effective a second spring member $46_{11}$ which, when the axial setting device is not activated, axially loads the supporting plate $14_{11}$ towards the pressure plate $10_{11}$, so that the clutch $41_{11}$ is opened. The spring member $46_{11}$ is axially supported via a stop disc 49 and an axial bearing $45_{11}$ so as to be rotatable relative to the supporting plate $14_{11}$. In its end face, the supporting plate $14_{11}$ may further comprise a recess in which the axial bearing $45_{11}$ and the stop disc 49 are received.

Figure 12:
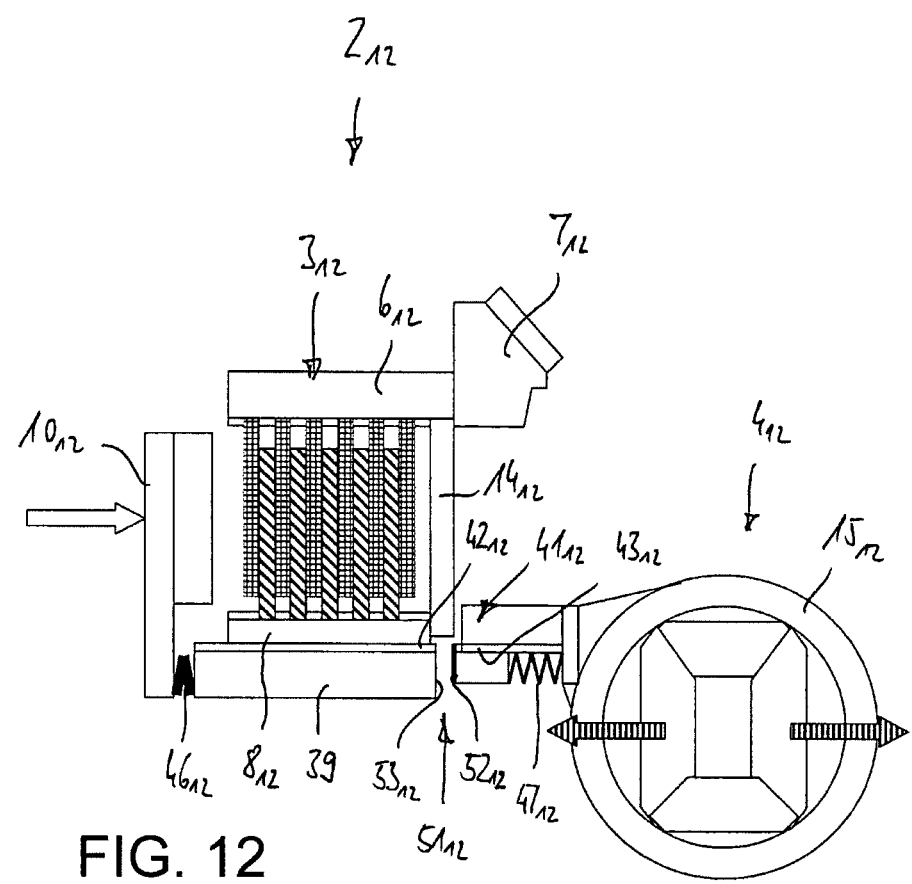
FIG. 12 shows an inventive coupling assembly in a further embodiment giving design principles in half a longitudinal section.

The embodiment according to FIG. 12 largely corresponds to that shown in FIG. 8 to the description of which reference is hereby made as far as common features are concerned, with identical components or components corresponding to one another having been given the same reference numbers with a subscript. The present embodiment is characterized in that the coupling output part $8_{12}$ is axially non-displaceable. The pressure plate $10_{12}$ acts via the spring means $46_{12}$ on a sliding sleeve 39 which is held so as to be axially displaceable and rotationally fixed relative to the coupling output part $8_{12}$. The sliding sleeve 39 thus has the setting function, first for synchronising the speed of the coupling output part $8_{12}$ relative to the carrier element $15_{12}$ by use of the synchronising unit $51_{12}$ and, secondly, for providing a rotationally fixed connection with the carrier element $15_{12}$ by the clutch $41_{12}$. An exemplary advantage of the present embodiment includes that the coupling output part $8_{12}$ can be held so as to be axially non-displaceable in the coupling assembly $2_{12}$.

All the above-mentioned embodiments are advantageous in that the driving axle connectable via the inventive coupling assembly can be disconnected from the driveline by opening the friction coupling. In this condition, the components of the differential drive rotate with the driving axle in a load-free condition. The coupling input part and, if required, the coupling output part and all drive parts positioned in the torque flow upstream of the friction coupling are disconnected from the driving axle, so that drag moments and friction losses are reduced. In this way, fuel consumption can be reduced when the secondary driving axle is not driven.

Figure 1B:
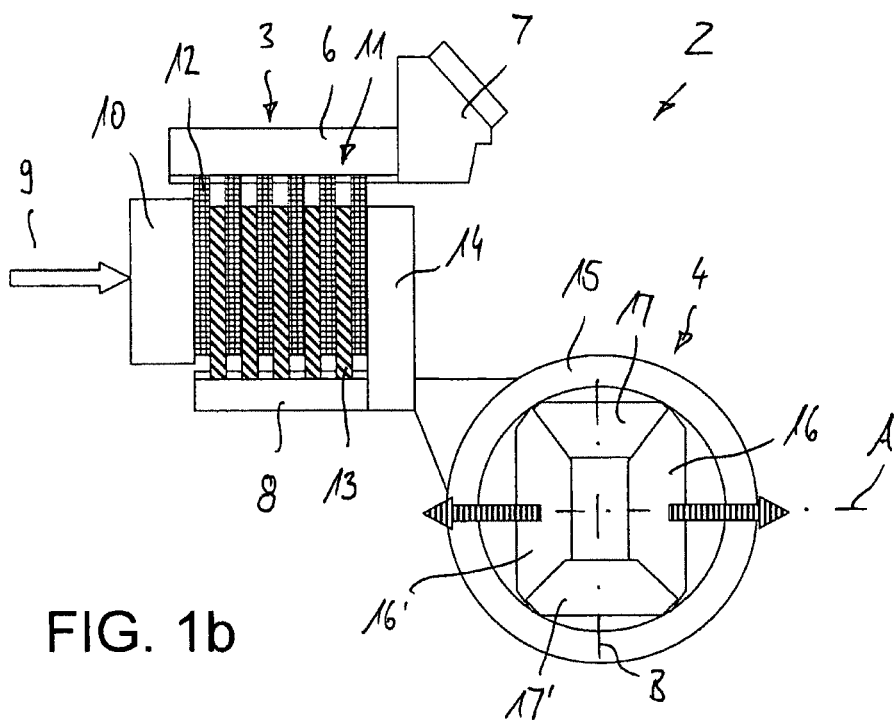
Figure 13:
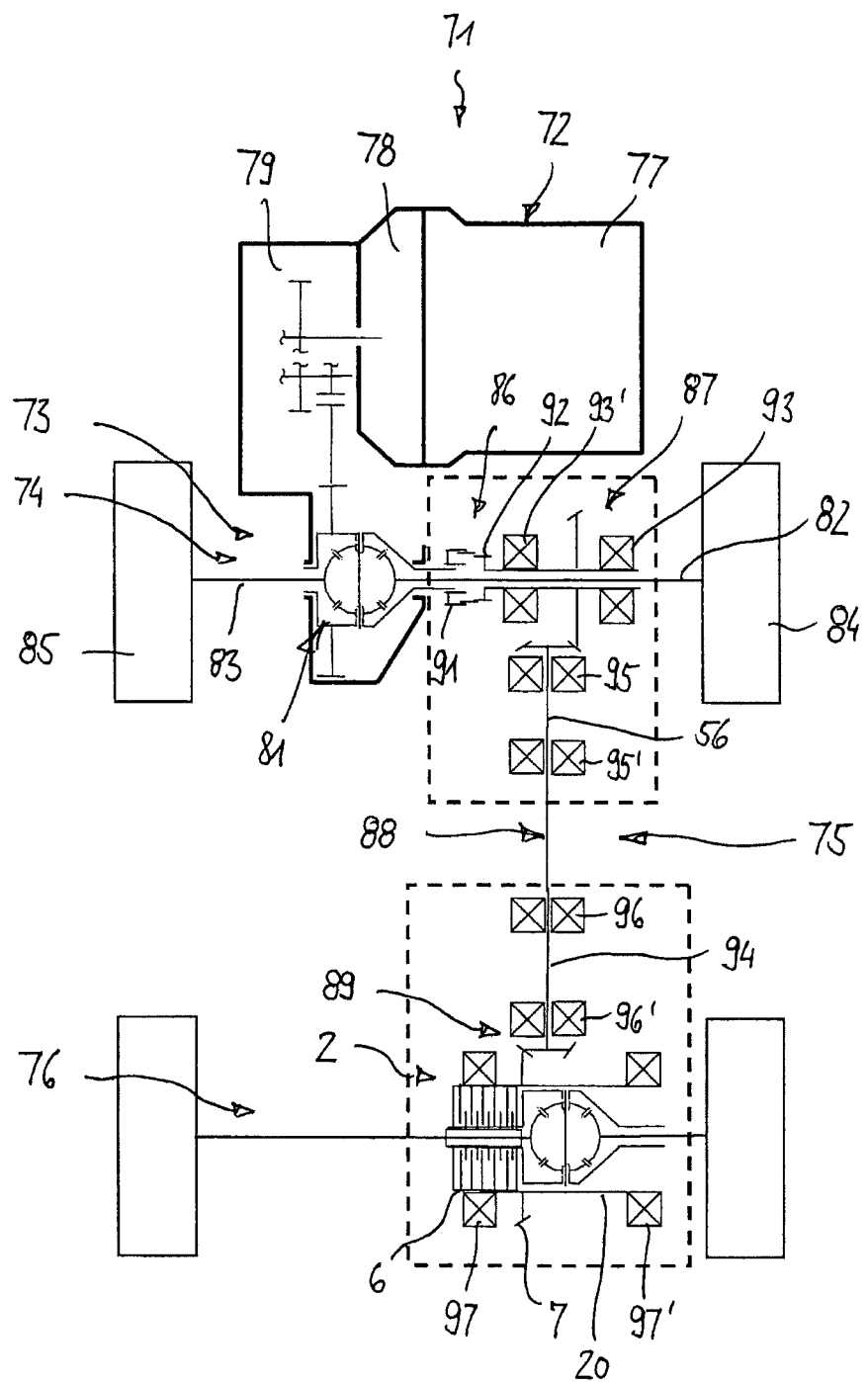
FIG. 13 shows an inventive driveline assembly with an inventive coupling assembly according to FIG. 1, giving design principles.

FIG. 13 diagrammatically shows an exemplary arrangement of an inventive driveline assembly for a motor vehicle driven by a plurality of axles and having a coupling assembly according to the exemplary embodiment of FIG. 1. Of the motor vehicle 71, it is possible to see the drive unit 72, a first driveline 73 for driving a first driving axle 74 and a second driveline 75 for driving a second driving axle 76. The drive unit 72 comprises an internal combustion engine 77, a coupling 78 and a gearbox 79 via which torque is introduced into the first and into the second driveline 73, 75. It is understood that the drive unit can also be any other suitable drive, for example an electric motor. The first driveline 73 comprises a transfer case 81 which distributes torque to the first driveline 73 and to the second driveline 75. The transfer case 81 comprises an axle differential 81 which, via the front sideshafts 82, 83, transmits the introduced torque to the associated wheels 84, 85. For the purpose of introducing torque into the differential carrier of the axle differential 81 there is provided a ring gear which is rotatingly driven by the gearbox 79.

The second driveline 75 comprises the following assemblies which are arranged in series and which, for torque transmitting purposes are drivingly connected to each other: a first coupling mechanism 86, a first angle drive 87, a propeller shaft 88, a second angle drive 89 and an inventive coupling assembly 2 which serves to drive the second axle 76. It can be seen that the above sequence of assemblies is not compulsory. For example, the first coupling mechanism can, in principle, also be arranged in the torque flow behind the first angle drive.

In the present embodiment, the coupling mechanism 86 is provided in the form of a form-fitting clutch, but other types of coupling such as a friction coupling can also be used. The clutch comprises an input part 91 which is driven by the transfer case 81, as well as an output part 92 which can be connected to and separated from the input part 91. The output part 92 is connected to the input shaft of the angle drive 87 to introduce torque into the angle drive 87 for driving the second driving axle 76. It can be seen that the input shaft of the angle drive 87 is arranged coaxially relative to the axis of rotation C around which the differential carrier also rotates. The input shaft is provided in the form of a hollow shaft and is rotatably arranged on the sideshaft 82. The input shaft, in turn, is connected to a ring gear in a rotationally fixed way which engages a bevel gear for the purpose of rotatingly driving the propeller shaft. The input shaft of the first angle drive 87 is supported by first and second bearings 93, 93' so as to be rotatable around the axis of rotation C. The bearings 93, 93' may be provided in the form of rolling contact bearings, however, other types of bearing, such as friction bearings, are not excluded. It is also understood that the angle drive 87 which can also be referred to as power take-off unit (PTU), could also be arranged on an axis of rotation which is arranged parallel to the first driving axle 74.

The propeller shaft 88, which is only shown diagrammatically, may be provided in the form of a multi-component shaft which comprises a first shaft portion 56 and a second shaft portion 94 which is connected to the first shaft portion 56 in a rotationally fixed way. Depending on the length of the propeller shaft 88 it is possible to provide an intermediate joint and an intermediate bearing (not illustrated). It can be seen that the front shaft portion 56 is rotatably supported by two bearing elements 95, 95' and that the rear shaft portion 94 is supported by further bearing elements 96, 96' so as to rotate around an axis of rotation D.

The second angle drive 89 comprises a driving pinion and a ring gear 7 in the form of an output which engages the driving pinion. The ring gear 7 is connected to the coupling input part 6 of the coupling assembly 2 in a rotationally fixed way. The coupling input part 6, respectively the housing 20 connected thereto, is supported by bearings 97, 97' so as to be rotatable around the axis of rotation A. In this case, too, the bearings 97, 97' are may be provided in the form of rolling-contact bearings, with other types of bearings, such as, for example, friction bearings, also being suitable.

An exemplary feature of the inventive driveline assembly includes that, by using the coupling mechanism 86 and the coupling assembly 2, it is possible to uncouple the front angle drive 87, the propeller shaft 88 and the rear angle drive 89 when the couplings 86, 3 are in the open condition. In said deactivated condition, said assemblies as well as the associated components are standing still, so that power losses due to drag moments and friction are avoided. Above all, if those components which rotate when being driven, are stationary, it is ensured that the associated bearings in which the components are rotatably supported, are also standing still. Overall, this results in a reduced fuel consumption for those driving conditions in which only the first driving axle 74 is driven, with the second driving axle 76 moving in a torque-free condition.

In respect of construction, the coupling assembly corresponds to the embodiment according to FIG. 1 and FIGS. 2 to 4 respectively, wherein the coupling output part 8 is directly and fixedly connected to the input part 15 of the differential drive 4. It is understood, however, that any other embodiments according to FIGS. 5 to 12 can also be used instead of the present coupling assembly.

The invention claimed is:

1. A coupling assembly for connecting a driving axle in a motor vehicle having multiple driving axles, the coupling assembly comprising:
an externally controllable friction coupling with a coupling input part and a coupling output part, wherein the coupling input part is rotatingly drivable around an axis of rotation,
a differential drive with an input element and two output elements which are drivingly connected to the input element,
wherein the input element of the differential drive is arranged coaxially relative to the coupling output part and drivably connected to the coupling output part for transmitting torque, and
a clutch arranged in series between the friction coupling and the differential drive, wherein the clutch comprises a first clutch part rotationally fixed to the coupling output part and a second clutch part rotationally fixed to the input element of the differential drive.

2. A coupling assembly according to claim 1, wherein the friction coupling is provided in the form of a multi-plate coupling and comprises an outer plate carrier to which outer plates are connected in a rotationally fixed and axially displaceable way, as well as an inner plate carrier to which inner plates are connected in a rotationally fixed and axially displaceable way.

3. A coupling assembly according to claim 1, wherein the friction coupling comprises a first pressure plate for loading a plate package that includes outer plates and inner plates, wherein the first pressure plate can be axially loaded by an externally controllable axial setting device.

4. A coupling assembly according to claim 1, wherein the coupling output part is integrally connected to the input element of the differential drive.

5. A coupling assembly according to claim 1, wherein the input element of the differential drive is provided in the form of a carrier element, wherein the differential drive comprises differential gears which are rotatably held in the carrier element and rotate jointly with the carrier element around the axis of rotation, as well as two sideshaft gears which are rotatably supported in the carrier element coaxially relative to the axis of rotation and which engage the differential gears.

6. A coupling assembly according to claim 1, wherein the input element of the differential drive is supported in the coupling input part so as to be rotatable around the axis of rotation.

7. A coupling assembly according to claim 1, wherein the clutch is a form-fitting clutch and wherein the first clutch part and the second clutch part can be made to engage one another in a form-fitting way for transmitting torque.

8. A coupling assembly according to claim 1, wherein the coupling output part is axially displaceable and can be axially loaded by a first pressure plate towards the input element.

9. A coupling assembly according to claim 1, wherein the coupling output part is axially displaced by loading a pressure plate, wherein the clutch is closed for the purpose of transmitting torque.

10. A coupling assembly according to claim 1, wherein between a pressure plate and the coupling output part there is provided a spring mechanism which axially loads the pressure plate and the coupling output part away from one another.

11. A coupling assembly according to claim 1, wherein between a pressure plate and the coupling output part, there is provided an axial bearing.

12. A coupling assembly according to claim 1, wherein there is provided first and second pressure plates, wherein the second pressure plate is connected to the coupling output part in a rotationally fixed and axially displaceable way, wherein a plate package is axially arranged between the first and the second pressure plates.

13. A coupling assembly according to claim 12, wherein the clutch is arranged between the second pressure plate and the input element of the differential drive.

14. A coupling assembly according to claim 12, wherein between the second pressure plate and the input element of the differential drive, there is arranged a spring mechanism which axially loads the second pressure plate towards the first pressure plate.

15. A coupling assembly according to claim 1, wherein between the coupling output part and the input element of the differential drive, there is provided a synchronizing unit.

16. A coupling assembly according to claim 15, wherein the synchronising unit comprises a pair of conical friction faces.

17. A coupling assembly according to claim 15, wherein, functionally, the synchronising unit and the clutch are arranged in parallel between the coupling output part and the input element of the differential drive, wherein, when the coupling output part is axially displaced, first the synchronising unit, at least partially, effects a speed adjustment and then the clutch effects a transmission of torque between the coupling output part and the input element of the differential drive.

18. A coupling assembly according to claim 3, further comprising a sliding sleeve which is connected to the coupling output part in a rotationally fixed way and is axially displaceable relative thereto, wherein the sliding sleeve, upon actuation of the first pressure plate, closes a clutch to achieve the transmission of torque from the coupling output part to the input element of the differential drive.

19. A driveline assembly for a motor vehicle with a drive unit and multiple driven axles, the driveline assembly comprising:
a first driveline which is permanently driven by the drive unit to transmit torque to a front first driving axle,
a second driveline that is configured to be optionally drivable by the drive unit for transmitting torque to drive a rear second driving axle, wherein the second driveline comprises a propeller shaft which is arranged in the torque flow between a transfer case driven by the drive unit and the rear second driving axle, wherein there is provided a coupling mechanism for coupling and uncoupling the propeller shaft relative to the transfer case, wherein the second driveline further comprises a coupling assembly that includes an externally controllable friction coupling with a coupling input part and a coupling output part, wherein the coupling input part is rotatingly drivable around an axis of rotation, a differential drive with an input element and two output elements which are drivingly connected to the input element, wherein the input element of the differential drive is arranged coaxially relative to the coupling output part and drivably connected to the coupling output part for transmitting torque; and wherein the coupling input part is drivingly connected to the propeller shaft.

* * * * *